United States Patent [19]

Tadokoro et al.

[11] 4,262,721

[45] Apr. 21, 1981

[54] PNEUMATIC AIRCRAFT TIRE WITH RADIALLY VARYING TREAD CONTOUR

[75] Inventors: Yukio Tadokoro, Higashiyamato; Kenji Matsumoto, Kodaira, both of Japan

[73] Assignee: Bridgestone Tire Co., Ltd., Tokyo, Japan

[21] Appl. No.: 61,782

[22] Filed: Jul. 27, 1979

[30] Foreign Application Priority Data

Aug. 4, 1978 [JP] Japan ................................ 53-94489

[51] Int. Cl.$^3$ ............................................ B60C 11/06
[52] U.S. Cl. ............................ 152/209 R; 152/352 R
[58] Field of Search ............... 152/209, 352 R, 352 A, 152/353 R, 353 C, 353 G

[56] References Cited

U.S. PATENT DOCUMENTS

| 3,410,329 | 11/1968 | Bezbatchenko, Jr. | 152/209 R X |
| 4,044,810 | 8/1977 | Taniguchi et al. | 152/209 R |

FOREIGN PATENT DOCUMENTS 2343747 3/1975 Fed. Rep. of Germany ...... 152/209 R

Primary Examiner—John T. Goolkasian
Assistant Examiner—Lois E. Boland
Attorney, Agent, or Firm—Sughrue, Rothwell, Mion, Zinn and Macpeak

[57] ABSTRACT

A highly durable pneumatic tire for aircraft is disclosed. The tire comprises a tread, a plurality of main grooves formed on the tread and extending substantially in the circumferential direction of the tire, and circumferential ribs spaced apart from each other by the main grooves. Among ribs coming into contact with ground under load, an outer contour of an outermost rib is made substantially discontinuous with respect to an outer contour of each of ribs adjoining the inside and outside of the outermost rib in the widthwise direction of the tire and is located at the inside of the outer contour of the adjoining ribs in the radial direction of the tire.

5 Claims, 8 Drawing Figures

PNEUMATIC AIRCRAFT TIRE WITH RADIALLY VARYING TREAD CONTOUR

This invention relates to highly durable pneumatic tires for aircraft and to improve tire performance strongly demanded in pneumatic tires for large size aircraft by reforming an outer contour of a section including a rotational axis of tire (hereinafter referred to as tire section).

In the pneumatic tires for aircraft, high-speed durability and wear resistance are required as most important performance. The high-speed durability is mainly dependent upon a heat generating temperature resulting from a guarantee for safety, while the wear resistance is mainly dependent upon a curvature of radius of a tire tread, a width of each of ribs and the like.

In the pneumatic tires of this type, not only the demand for the high-speed durability becomes strict in a viewpoint of highest safety, but also the economic demand is strongly required to increase the number of take-offs and landings. In order to satisfy both the above demands, it has hitherto been known to increase the curvature of radius of the outer contour of the tire section and widen the width of each of ribs defined by circumferential grooves. Thus, the enhancement of loading capacity and the improvement of high-speed durability and wear resistance has been attempted in the prior art.

Recently, improvement of environmental conditions such airport noise and the like has been demanded. For this end, various severe regulations are imposed on not only newly-established airports but also existing airports. As a countermeasure for such regulations, take-off and landing of aircraft are practically performed at a location apart from general residences and other installations irrelevant to the airport as far as possible by an extension of a taxiway extending to a runway. Therefore, there is a tendency of increasing a running distance or taxi distance of the aircraft from the taxiway to the runway.

As a result, a phenomenon of considerably raising the temperature of the tire during the taxi of the aircraft occurs due to the fact that the load applied to a main landing gear of the aircraft, particularly large size aircraft is great. This phenomenon brings about the following problem on safety or high-speed durability, which is one of most important performances in the pneumatic tires for aircraft. That is, a risk results that the tire temperature exceeds an over-heat limit during the running at a high speed required for the take-off. Under the above demand, the taxi distance is extended from the usual range of 2.5–3 km to a range of 4–5 km, while the load applied to the tire increases to 27 tons per a tire and the take-off speed reaches to 460 km/hr (235 MPH) during the taxi. Hence there is actually a possibility of overheating the tire to the extent directly bearing upon the safety of the tire.

In conventional pneumatic tires for aircraft, the outer contour of tire section is shown in FIG. 1a, wherein a tread T is usually designed so that a tread thickness $t_c$ of a crown center is substantially equal to a tread thickness $t_s$ of a shoulder portion with a single circular arc having a radius of curvature of the tread. Therefore, if the radius of curvature r is carelessly increased or the tire itself is run on a taxiway with a longer taxi distance, it is difficult to suppress an acceleration of heat generation to a certain limit exerting upon the safety during the take-off running as apparent from the following. In FIG. 1b, a distribution of heat generating temperature of the conventional pneumatic tire is compared at a running distance $Y_1$ under the conventional use conditions and at a running distance $Y_2$ under use conditions on an extended taxiway. For use conditions, a tire size of 46×16 30PR, has a normal inflation pressure of 15.8 kg/cm$^2$, a normal load of 21,185 kg, a running speed on a taxiway of 50 km/hr, a taxying distance of 3 km in case of $Y_1$ and 5 km in case of $Y_2$ and the same take-off distance as used in the prior art. That is, the running distance Y is a sum of the taxi distance and the take-off distance.

In FIG. 1b, an ordinate represents a heat generating temperature (°C.) and an abscissa represents a temperature measuring position with respect to a right radial half section of a tire tread.

Under the use conditions for $Y_2$, a peak of heat generation particularly appears in that portion corresponding to an outermost rib $R_3$ defined by main grooves 1 in a widthwise direction of tire, which comes into contact with ground under load, as apparent from the graph of FIG. 1b. Further, the temperature of such a portion exceeds 120° C., which is usually called a critical temperature limit, and also the distribution of heat generating temperature becomes considerably non-uniform as compared with the case under the use conditions for $Y_1$. On the other hand, the heat generating temperature under the conventional use conditions for $Y_1$ never exceeds the critical temperature limit of 120° C.

The tendency under the conditions for $Y_2$ becomes more conspicuous in large size aircraft, particularly when the applied load increases.

Under the above circumstances, the invention is to advantageously solve the drawbacks of the prior art. That is, the inventors have proposed that the outer contour of tire section is reformed to effectively suppress the acceleration of heat generation accompanied with the increase of taxi distance below the critical temperature limit in view of the tire safety without sacrificing other performances, particularly wear resistance. As a result, there have been developed highly durable pneumatic tires for aircraft capable of following change of use conditions.

The inventors have confirmed from many experiments for the conventional pneumatic tires that the heat generation is suppressed below critical temperature limit in the tires for not only small size but also large size aircraft under the conventional use conditions for $Y_1$ shown in FIG. 1b. Also the distribution of heat generating temperature is not abnormally changed even in the pneumatic tires for large size aircraft.

However, it has been confirmed that not only the heat generating temperature but also the distribution thereof clearly become unsuitable in the safety under the use conditions for $Y_2$.

The inventors have pursued a cause of the above problem and found that a non-uniform ground contact pressure, which is insignificant under the conventional use conditions, remarkably influences the heat generating temperature and the distribution thereof under the use conditions for $Y_2$. In consideration of this result, the inventors have made various experiments and studies and established an effective countermeasure as mentioned below.

According to the invention, there is provided a highly durable pneumatic tire for aircraft comprising a tread, a plurality of main grooves formed on said tread and extending substantially in the circumferential direction of the tire, and circumferential ribs spaced apart from each other by said main grooves, characterized in that an outer contour of an outermost rib among those ribs which come into contact with ground under load is made substantially discontinuous with respect to an outer contour of each of ribs adjoining to the inside and outside of the outermost rib in the widthwise direction of the tire and is located at the inside of the outer contour of each of the adjoining ribs in the radial direction of the tire. As a result a distribution of heat generating temperature of the tread is made uniform during the high speed running of the tire.

The invention will now be described in greater detail with reference to the accompanying drawings, wherein.

Figure 2A:
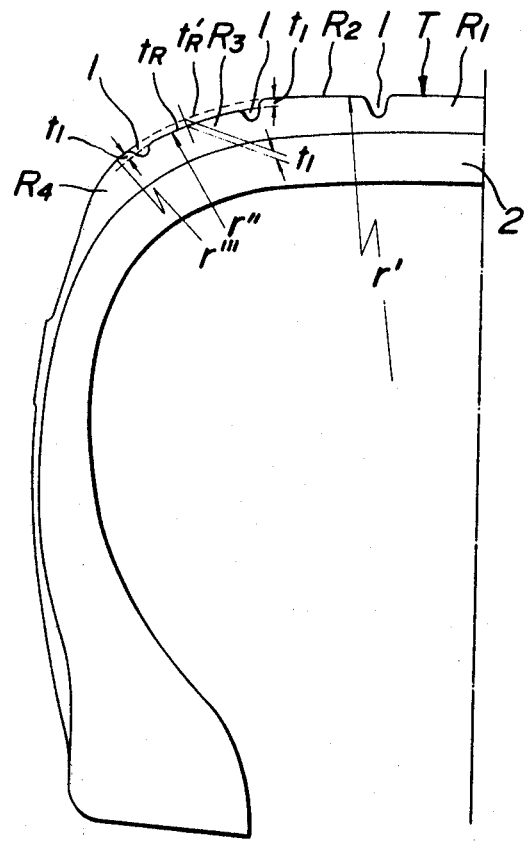
FIG. 2a is a schematic radial half section of the pneumatic tire for aircraft according to the invention.

Referring now to the drawings, FIG. 2a is a radial left half section of an embodiment of the pneumatic tire for aircraft according to the invention.

The pneumatic tire comprises a tread T and a carcass casing 2. Six circumferential main grooves 1 are formed on the tread T and extend substantially in the circumferential direction of the tire. By these main grooves 1 are spaced apart 5 circumferential ribs $R_1$, $R_2$ and $R_3$ and further a pair of side ribs $R_4$ are provided near shoulder portions of the tread T. The outer contour of tire section composed of these ribs is constructed with three kinds of radius of curvature $r'$, $r''$ and $r'''$, wherein $r'$ is the radius of curvature of the ribs $R_1$ and $R_2$, $r''$ is the curvature of the rib $R_3$, and $r'''$ is the radius of curvature of the rib $R_4$.

According to the invention, it is a most important feature that the center of radius of curvature $r''$ of the rib $R_3$ or the outermost rib among those ribs which come into contact with ground under normal load is shifted respect to the center of the ribs $R_2$ and $R_4$ adjoining to the inside and outside of the rib $R_3$ in the widthwise direction of the tire. That is, the outer surface $t_R$ of the rib $R_3$ is made lower than a naturally possible level $t'_R$ of the outer surface inward in the radial direction of the tire. This is particularly important for making the distribution of ground contact pressure of the tread uniform.

Figure 2B:
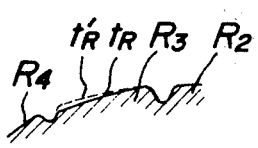
FIGS. 2b to 2d are fragmentary sectional views of modifications according to the invention, respectively.
Figure 2C:
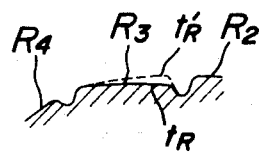
Figure 2D:
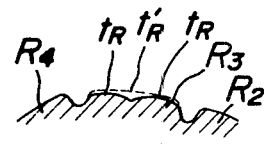

As shown in FIG. 2a, the outer surface of the rib $R_3$ is shifted inward in the radial direction of the tire with a single radius of curvature ($r' = r'' = r'''$) at a uniform level difference $t_1$. This level difference or shifted quantity is preferably 1-2 mm. Further, the outer surface of the rib $R_3$ may be tilted at either edge even with the single radius of curvature as shown in FIGS. 2b and 2c. Alternatively, it is possible to design either uniform or ununiform level difference between the outer surface of the rib $R_3$ and the outer surfaces of the adjoining ribs $R_2$ and $R_4$ by a combination of two radii of curvatures as shown in FIG. 2d.

The wording "substantially discontinuous" used herein means that if the rib $R_3$ is smoothly connected to the adjoining ribs $R_2$ and $R_4$, that the edge portions of the ribs $R_2$ and $R_4$ would be somewhat cut off in accordance with the difference in level.

The invention will now be described with reference to an example.

Figure 1A:
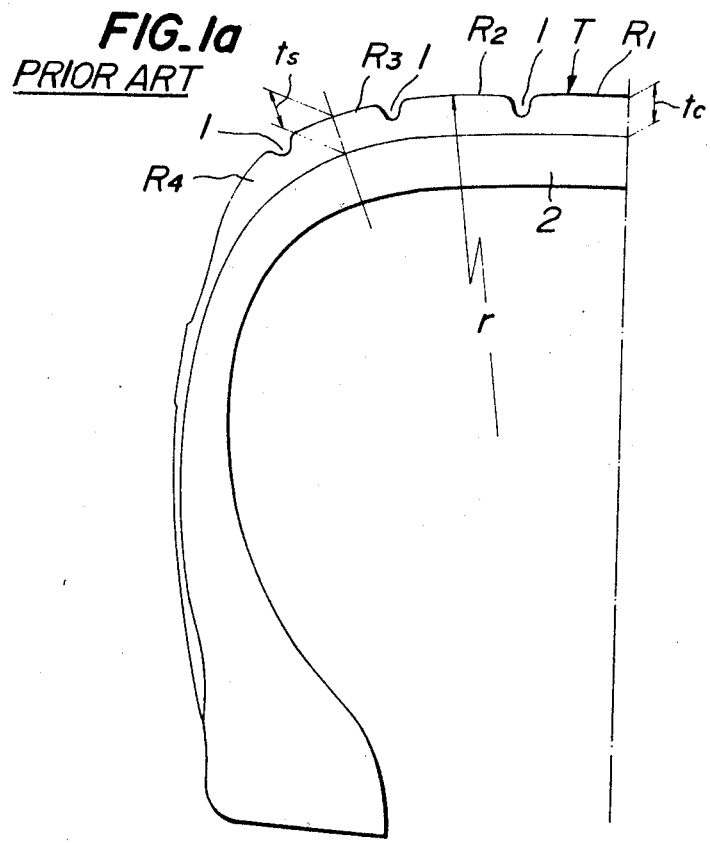
FIG. 1a is a schematic radial half section of the conventional pneumatic tire for aircraft as mentioned above.

The pneumatic tires for aircraft with a tire size of 46×16 30PR are manufactured so that the structure of the carcass casing and the number of the main groove formed on the tread T are the same as those of the conventional tire (FIG. 1a), except that the tread has a composite crown with three kinds of the radius of curvature different from the single curvature of radius of the tread in FIG. 1a.

According to the invention, the pneumatic tire (solid line of FIG. 2a, hereinafter referred to as tire A) is characterized in that the outer contour of the rib $R_3$ has a discontinuous difference in level $t_1$ with respect to those of the adjoining ribs $R_2$ and $R_4$ by shifting the center of the radius of curvature $r''$ of the rib $R_3$ inward in the radial direction of the tire though the radius of curvature $r''$ is the same as that of a control tire (broken line of FIG. 2a, hereinafter referred to as tire B). On the other hand, the tire B is designed to make the outer contours of all ribs smoothly continuous with the single radius of curvature ($r' = r'' = r'''$) at the same center thereof, so that it is substantially the same as the tire of FIG. 1a.

In the tire A, the outer contour $t_R$ (solid line) of the rib $R_3$ is shifted inward from and parallel to the outer contour $t'_R$ (broken line) at a difference in level of 1.2 mm.

Figure 3A:
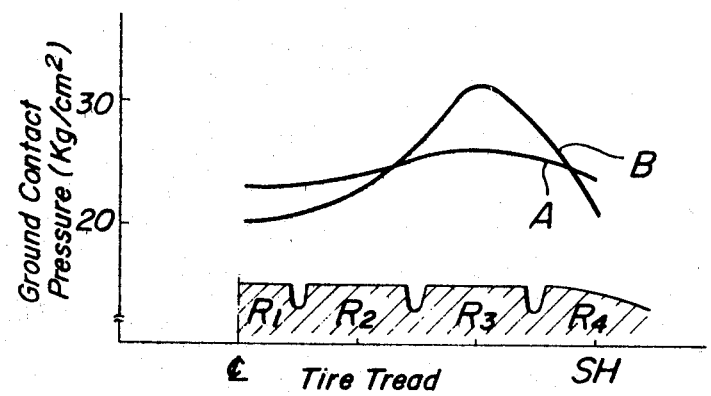
FIG. 3a is a graph showing a ground contact pressure of a tread in the pneumatic tires for aircrafts according to the invention and the prior art.
Figure 3B:
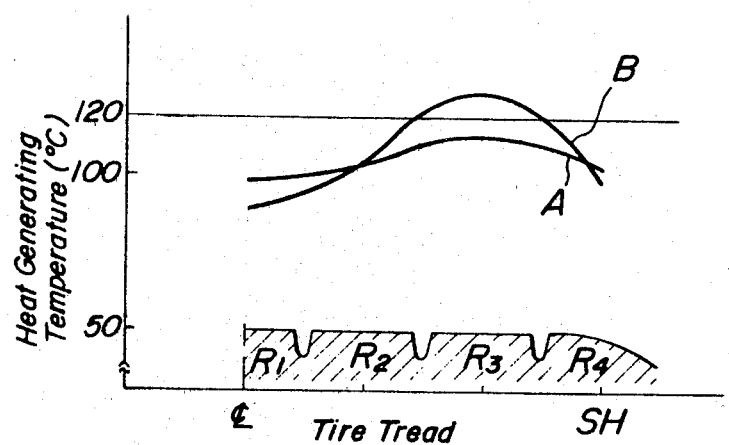
FIG. 3b is a graph showing a heat generating temperature of a tread in the pneumatic tires for aircraft according to the invention and the prior art.

Both the tires A and B are tested with respect to the distribution of ground contact pressure and the distribution of heat generating temperature and test results are shown in FIGS. 3a and 3b.

The distribution of static ground contact pressure is measured under such a condition that the inflation pressure is 15.8 kg/cm² and the normal load is 21,185 kg to obtain a result as shown in FIG. 3a wherein an ordinate represents a ground contact pressure per unit area and an abscissa represents a measuring position with respect to a right radial half section of the tread. As apparent from FIG. 3a, the tire A exhibits a fairly uniform distribution of ground contact pressure as compared with the tire B.

Figure 1B:
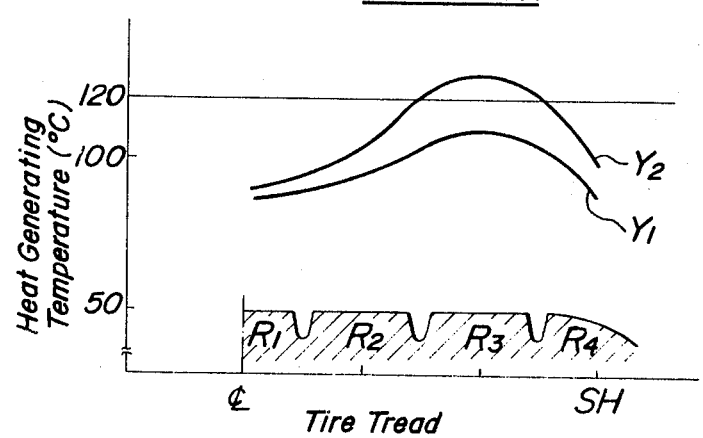
FIG. 1b is a graph showing a heat generating temperature of tread in the conventional pneumatic tire as mentioned above.

The heat generating temperature and distribution thereof are measured after the running under the same conditions as those of FIG. 1b, except that the taxying distance is 5 km, to obtain a result as shown in FIG. 3b wherein an ordinate represents a heat generating temperature (°C.) and an abscissa is the same as that of FIG. 3a. As apparent from FIG. 3b, the tire A satisfactorily maintains a temperature below the critical temperature limit even when the taxi distance is considerably extended, while the tire B exhibits the acceleration of heat generation exceeding the critical temperature limit.

As mentioned above, the highly durable pneumatic tire for aircraft according to the invention not only makes it possible to advantageously and safely run the aircraft, particularly large size aircraft in opposition to the change of environmental conditions such as an extension of a taxiway in an airport and the like without sacrificing the economy and other tire performances, but also considerably improves a durability by effectively suppressing the heat generation of the tire.

What is claimed is:

1. In a pneumatic tire for large aircraft comprising a tread, a plurality of main grooves formed on said tread and extending substantially in the circumferential direction of the tire, and circumferential ribs spaced apart from each other by said main grooves, the improvement characterized in that an outer contour of an outermost rib among those ribs which come into contact with ground under load is made substantially discontinuous with respect to an outer contour of each of ribs adjoining the inside and outside of said outermost rib in the widthwise direction of the tire and, said outer contour of said outermost rib is located inside an outer surface defined by the outer contours of said each adjoining rib in the radial direction of the tire, whereby a distribution of heat generating temperature of said tread is made uniform during the high speed running of the tire.

2. The pneumatic tire as claimed in claim 1, wherein the outer contour of said outermost rib is shifted inward from the outer contour of said adjoining ribs at a level difference of about 1–2 mm in the radial direction of the tire.

3. The pneumatic tire as claimed in claim 1, wherein the outer contour of said outermost rib has substantially the same radius of curvature as those of said adjoining ribs and shifted inward in the radial direction of the tire.

4. The pneumatic tire as claimed in claim 1, wherein the outer contour of said outermost rib has a plurality radii of curvatures which are different from each other.

5. The pneumatic tire as claimed in claim 1, wherein the outer contour of said outermost rib is shifted at different levels with respect to edge portions of said adjoining ribs inward in the radial direction of the tire.

* * * * *